United States Patent [19]

Crane et al.

[11] Patent Number: 4,731,809
[45] Date of Patent: Mar. 15, 1988

[54] INDOOR TELEPHONE NETWORK INTERFACE DEVICE

[75] Inventors: Robert A. Crane, Windham; David H. Dowler, Portland, both of Me.

[73] Assignee: GTE Products Corporation, Stamford, Conn.

[21] Appl. No.: 898,567

[22] Filed: Aug. 21, 1986

[51] Int. Cl.⁴ .............................................. H04M 1/00
[52] U.S. Cl. ...................................... 379/27; 379/428
[58] Field of Search ................... 379/26, 29, 102, 188, 379/199, 372, 377, 397, 399, 27, 387, 428, 429, 433; 361/380, 426, 428; 339/122 R, 123, 176 M; D13/30

[56] References Cited

U.S. PATENT DOCUMENTS

| D. 275,667 | 9/1984 | Dellinger et al. | D13/30 |
| 4,146,292 | 3/1979 | Garrett | 339/176 M |
| 4,407,559 | 10/1983 | Meyer | 339/176 M |
| 4,488,008 | 12/1984 | Dellinger et al. | 379/30 |
| 4,500,158 | 2/1985 | Dola | 339/122 R |
| 4,562,311 | 12/1985 | Dola | 379/27 |
| 4,647,725 | 3/1987 | Dellinger et al. | 379/29 |

OTHER PUBLICATIONS

Suttle Apparatus Corp., Guide to Telephone Wiring, Rec. 6-27-85, p. 8.

Primary Examiner—Stafford D. Schreyer
Attorney, Agent, or Firm—James Theodosopoulos

[57] ABSTRACT

A telephone network interface device adapted to be placed within a standard receptacle box including a face plate and a housing containing terminal posts disposed on the rear of the housing. A cover is detachably arranged over an array of terminal posts that are adapted to be connected to the telephone company's portion of the telephone network and terminal posts are exposed for subscriber access to the portion of the posts that are connected to the subscriber's portion of the telephone system.

16 Claims, 7 Drawing Figures

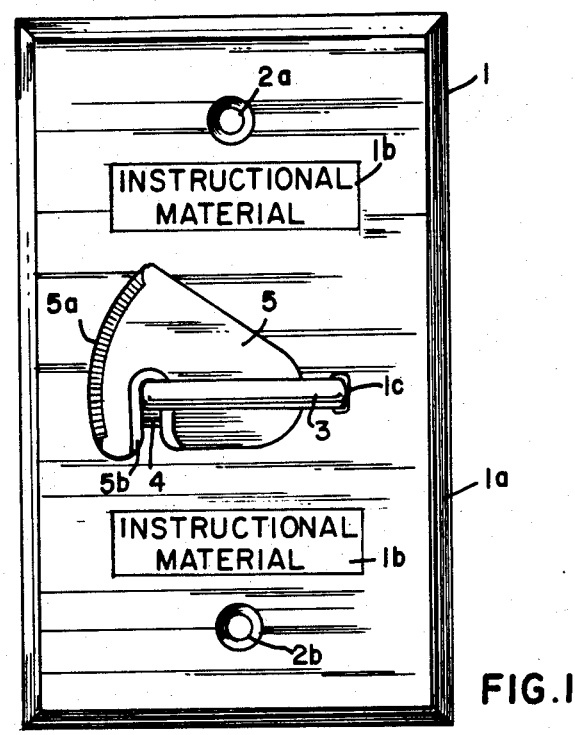
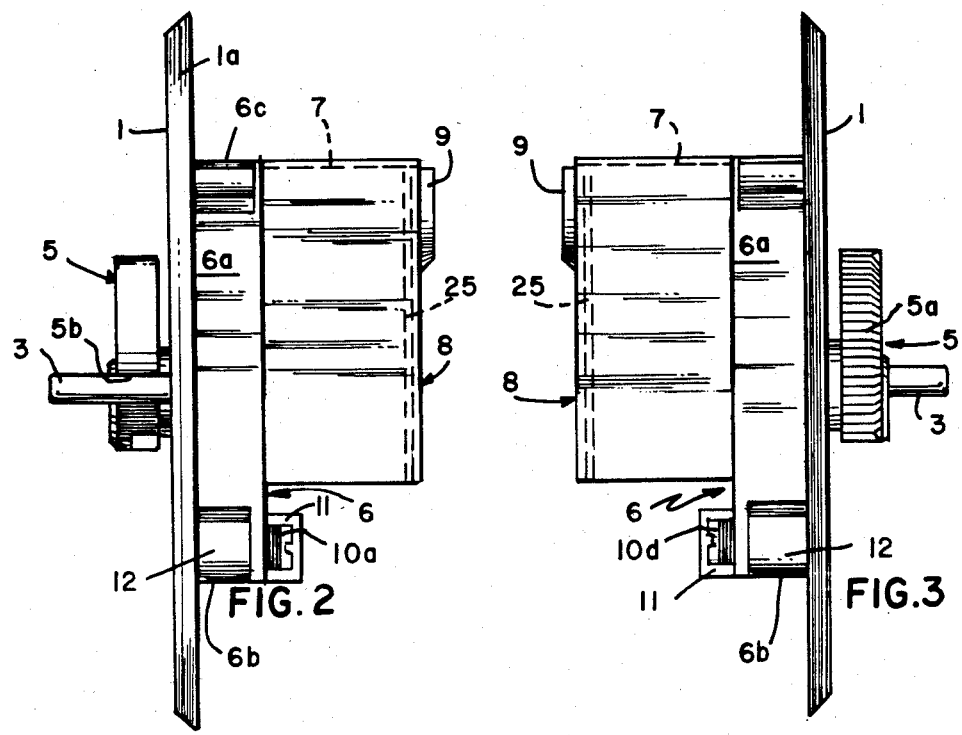

INDOOR TELEPHONE NETWORK INTERFACE DEVICE

FIELD OF THE INVENTION

The present invention relates to network interface devices and particularly to a device that can be utilized indoors in a standard electrical receptacle box.

In some areas, particularly when several telephone subscribers are located in a single building, it is desirable to place a telephone network interface device in a location that is easily accessible to the telephone subscriber. This location can be used to define a clear point of demarcation between the portion of the network owned by the subscriber and that which is owned by the telephone company.

The network interface device is installed on the premises of each subscriber in the building and it will permit testing of the integrity of the part of the network that is owned by the telephone company and that which is owned by the subscriber. In the usual case, if an interruption of service is detected by the subscriber, the subscriber is able to test the circuit by placing the plug of the telephone directly into the jack of the telephone network interface device. If a dial tone is heard, the subscriber knows that the telephone service to the premises is operating properly, and that the portion of the network belonging to the subscriber is faulty. The subscriber's telephone itself can also be tested by substituting one telephone for another in the jack.

In this way, a subscriber may avoid service charges by the telephone company arising from subscriber complaints regarding faulty telephone service in those instances where the faulty service is in the portion of the subscriber loop not belonging to the telephone company. Quite advantageously also to the telephone company, discussions as to the responsibility of the difficulty can be eliminated because the system either works at the point of the network interface device or it does not.

SUMMARY OF THE INVENTION

The telephone network interface device of the present invention is designed for disposition within a building, and especially in a building in which there are a plurality of telephone lines, each of which provides service to individual subscribers. The device of the present invention is adapted and designed to fit into a standard electrical box. Apertures in the face plate of the device are arranged to receive screws of conventional design and which will fit into female members of a standard electrical receptacle box so that wiring is made simple for the telephone installer. The device includes a face plate that covers a housing. A conventional RJ 11C four or six line modular plug and a compatible, conventional RJ 11C jack is utilized. The plug is disposed upon the surface of the face plate and it extends through an electrical cable to an array of posts that are disposed on the housing behind the face plate. A movable guard is disposed over the plug to prevent accidental dislodgement as well as providing protection from damage and contamination.

The housing is arranged with side walls and a cover which allow access (by the subscriber) to posts that are connected to the subscriber's portion of the loop. The housing and its cover hide posts that are connected to the telephone company's portion of the loop. The cover is fastened to the housing so that it is difficult for a subscriber to remove without having appropriate tools. In this way, the subscriber can be impeded in tampering with the portion of the telephone circuit owned by the telephone company. Ribs within the cover can be used to locate electronic devices that are installed at the discretion of the telephone company.

BRIEF DESCRIPTION OF THE DRAWINGS

FIG. 1 is a front elevational view of the telephone network interface device according to the present invention.

FIGS. 2 and 3 are side elevational views of the device shown in FIG. 1 and especially showing the housing and cover which contains the wiring for the device.

DESCRIPTION OF THE PREFERRED EMBODIMENTS

Figure 4:
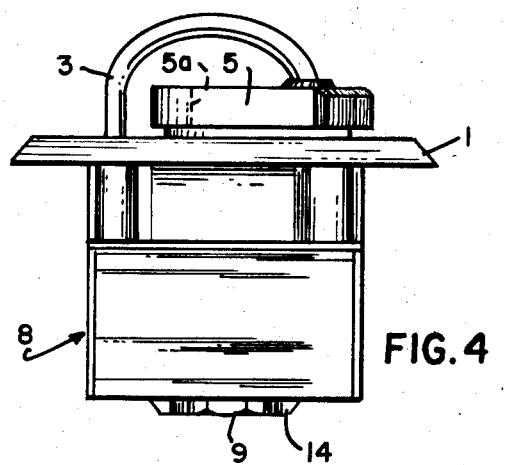
FIGS. 4 and 6 are top and bottom views of the device shown in FIG. 1.

As shown in FIG. 1, the telephone network interface device includes a face plate 1 with apertures 2a and 2b spaced apart and arranged in standard dimensions so it can be placed in a standard electrical wall receptacle. The edge 1a is decoratively bevelled to cover the wall receptacle and hide any possible damage that may have occurred on the wall. Descriptive indicia 1b is placed upon the surface of the face plate 1 to contain instructional material such as how to test the phone line and what to do if a problem occurs. The descriptive indicia 1b is located at a place that is easily observed by the telephone subscriber.

A cable 3 extends through an aperture 1c in face plate 1. The cable is a group of wires that are sheathed in plastic to allow for their protection and provide for a decorative finish to the device. The cable 3 terminates in a conventional RJ 11C modular plug 4 that is inserted into RJ 11C jack (not shown) which is fitted into a jack housing (also not shown). A guard 5 with a knurled edge 5a and a receiving slot 5b is disposed over the plug 4. The guard 5 rotates about an axis located beneath the group of wires 3 and is removed by engaging the knurled edge 5a and turning it clockwise. The receiving slot 5b will move away from the plug 4 to expose it for removal and to allow a test of the lines and the telephone equipment.

Referring now to FIGS. 2 and 3, a housing 6 is disposed upon the rear of the face plate 1. The housing includes two side walls 6a, a housing bottom wall 6b and a housing top wall 6c. The housing top wall 6c has a top wall extension which provides a wall for cover 8. A step 9 is disposed near the top of the cover 8 and protects a fastener from removal, as will be described later. The fastener disposed within step 9 holds the cover 8 to the housing 6 whereby to cover the portions of the wires leading from the telephone company's network to the telephone network interface device.

A first array of terminal posts 10 (10a and 10d being shown) are disposed in the housing 6 on pillars 12 that are formed on the housing bottom wall 6b. The pillars 12 receive the terminal posts 10 for their connection to the subscriber's telephone. Each of the terminal posts are insulated by means of separators 11 that are disposed between adjacent pillars 12 on the housing bottom wall 6b.

Figure 5:
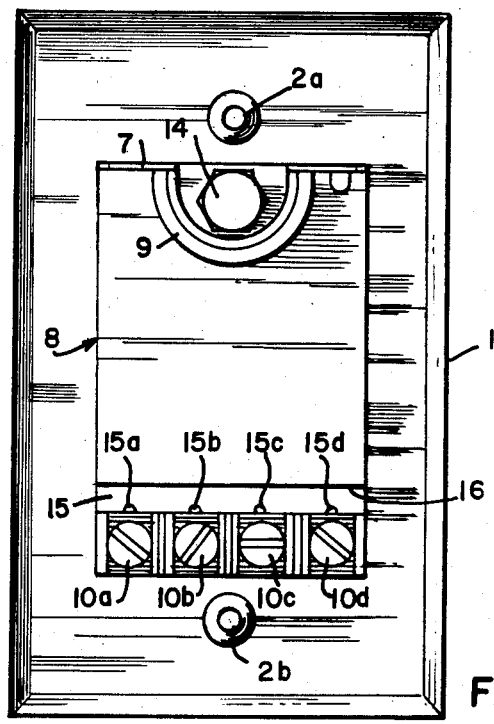
FIG. 5 is a rear elevational view of the device with the cover in place.

As shown in FIG. 5, the fastener 14 is disposed within the encircling step 9. The space between the encircling step 9 and the edge of the fastener 14 is such that ordinary household tools cannot be readily placed over the head of the fastener 14 to remove it. Tools such as pliers cannot fit within the confines of the area formed between fastener 14 and step 9. In a preferred embodiment, the shape of the head of the fastener 14 is such that only an unusual tool can unscrew it, that is one which is not usually found in a home.

Cover 8 fits against top wall extension 7 and is secured to the housing by means of the fastener 14. A lip 15 extends from the edge of cover bottom wall 16. A series of apertures 15a, 15b, 15c and 15d are formed on the edge of lip 15 to receive color coded wires from the first array of terminal posts 10a through 10d. Either lip 15 or cover bottom wall 16 serves a suitable location for a color coding indicia strip which is labelled in the appropriate red, green, yellow and black colors that are conventionally used with RJ 11C jacks and modular plugs. The appropriate wires extend through apertures 15a to 15d are attached with conventional spade-like connectors to the terminal posts.

Figure 6:
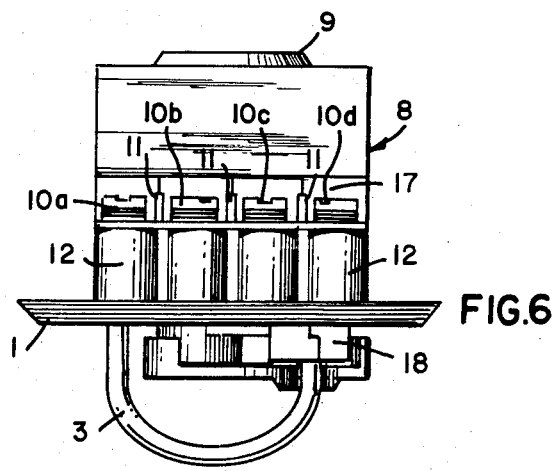

Referring to FIGS. 4 and 6, it can be seen that the cable 3 extends from the face plate to the RJ 11C modular plug is covered by means of the guard 5. Guard 5 pivots about an axis 5a so that the modular plug can be removed from the jack. As can be seen in FIG. 6, the posts 10a through 10d are disposed in pillars 12. The wires from these terminal posts 10 extend internally of the cover 8 thence via cable 3 to plug 4.

Figure 7:
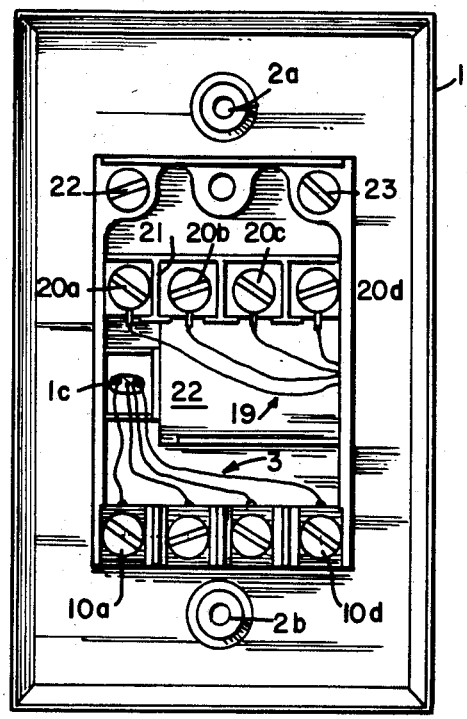
FIG. 7 is a rear elevational view of the device shown in FIG. 5 with the cover removed to expose the posts that are connected to the portion of the subscriber loop belonging to the telephone company.

Turning now to FIG. 7, the cover 8 is removed to expose the connections and wires disposed within. As can be seen, the wires from posts 10a to 10d extend to aperture 1c. From aperture 1c, the wires of cable 3 extend to the modular plug. Wires 19 extend from a first array of terminal posts 20a through 20d to the modular jack. Terminal posts 20a through 20d are hidden from view, normally, by means of cover plate 8 and tampering is inhibited by means of fastener 14 and step 9. Fastener 14 is screwed into hole 14a. The individual terminal posts are separated from each other by means of separators 21. An inner cover 25a shields the rear of the modular jack from damage and contamination.

Electronic components for the telephone network interface device can be mounted on ribs 25 (shown in phantom lines on FIGS. 2 and 3) which are in an interior container covered by interior cover 25a.

These electronic components can be for example, the conventional half-ringer electronics or maintenance termination systems. If such maintenance termination systems are installed, they may be conveniently wired to terminal posts 22 and 23.

It is apparent that modifications and changes can be made within the spirit and scope of the present invention but it is our intention, however, only to be limited by the scope of the appended claims.

As our invention, we claim:

1. A telephone network interface device comprising:
 a housing to be fixedly disposed in a standard electrical receptacle box to be fitted on the interior of a building; and
 a decorative face plate arranged to be the surface viewed from the interior of the building and jack and plug means disposed on said housing, said housing being of smaller length and width than said face plate, whereby said housing will fit in said standard electrical receptacle box; and
 a first array of terminal posts and a second array of terminal posts disposed on said housing; and
 wire means connecting said first array of terminal posts to said jack and wire means connecting said second array of terminal posts to said plug; and
 cover means detachably secured to said housing, said cover means enclosing the first array of terminal posts, but allowing access to said second array of terminal posts by a telephone subscriber.

2. The telephone network interface device according to claim 1 wherein said housing includes a housing top wall and a housing bottom wall and two housing side walls; and
 a top wall extension disposed on said housing top wall.

3. The telephone network interface device according to claim 2 wherein said cover includes a cover bottom wall and two side walls, said two side walls engaging said top wall extension to form a cover for the first array of terminal posts.

4. The telephone network interface device according to claim 3 further including a fastener disposed through said cover which engages a female member disposed upon said top wall extension and a step arranged in relation to said fastener so as to inhibit removal of said fastener by the subscriber.

5. The telephone network interface device according to claim 4 further including a lip extending from the cover bottom wall to engage the housing bottom wall, and indicia means disposed upon said lip or said cover bottom wall to indicate color coding of said second array of terminal posts to the telephone subscriber.

6. The telephone network interface device according to claim 1 wherein instructional indicia means are disposed upon the external surface of the face plate.

7. The telephone network interface device according to claim 6 wherein the indicia means provides a telephone subscriber with instructional messages for testing of the integrity of the telephone system.

8. The telephone network interface device according to claim 1 further including an interior container and an interior cover disposed thereon, said interior container being disposed within said housing, said interior container adapted to contain electronics necessary for the operation or testing of the telephone system.

9. The telephone network interface device according to claim 1 wherein at least two fastener-receiving apertures are disposed in said face plate, said apertures being spaced and arranged so that the device can be attached to a standard electrical receptacle box with the housing and cover being disposed within said receptacle box.

10. A telephone network interface device for diposition within a standard electrical receptacle box within a building, said device comprising:
 a housing to be fixedly disposed in the receptacle box, said housing including side walls, a top wall and a bottom wall; and
 a decorative face plate arranged to be the surface viewed from within the building and jack and plug means disposed on said housing, said housing being of smaller length and width than said face plate, whereby said housing will fit in said standard receptacle box; and
 a first array of terminal posts disposed in said housing and a second array of terminal posts disposed on said bottom wall; and means electrically connecting said first array of terminal posts to said jack and means electrically connecting said second array of terminal posts to said plug; and cover means detachably secured to said housing, said cover means enclosing the first array of terminal posts, but allowing access to said second array of terminal posts by a telephone subscriber.

11. The telephone network interface device according to claim 10 wherein said cover means includes a cover bottom wall and two side walls, said two side walls engaging a top wall extension on said top wall of said housing to form a cover for the first array of terminal posts.

12. The telephone network interface device according to claim 10 further including a fastener disposed through said cover which engages a female member disposed upon said top wall extension and a step arranged in relation to said fastener so as to inhibit removal of said fastener by the subscriber.

13. The telephone network interface device according to claim 12 further including a lip extending from the cover bottom wall to engage the housing bottom wall, and indicia means disposed upon said lip or said cover bottom wall to indicate color coding of said second array of terminal posts.

14. The telephone network interface device according to claim 12 wherein instructional indicia means are disposed upon the external surface of the face plate, whereby to provide a telephone subscriber with instructional messages.

15. The telephone network interface device according to claim 10 further including an interior container and an interior cover disposed thereon, said interior container being disposed within said housing and arranged for mounting electronics necessary for the operation or testing of the telephone system.

16. The telephone network interface device according to claim 10 wherein at least two fastener-receiving apertures are disposed in said face plate, said apertures being spaced and arranged so that screws can be fitted therein so that the device can be attached to female threaded members of a standard electrical receptacle box.

* * * * *